United States Patent
Lu et al.

(10) Patent No.: US 9,306,201 B2
(45) Date of Patent: Apr. 5, 2016

(54) POWER SUPPLY UNIT FOR ELECTRIC VEHICLE

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Jia Lu, Guangdong (CN); Zhipei Lu, Guangdong (CN); Jianhua Zhu, Guangdong (CN)

(73) Assignees: BYD Company Limited, Shenzhen, Guangdong (CN); Shenzhen BYD Auto R&D Company Limited, Shenzhen, Guangdong (CN)

( * ) Notice: Subject to any disclaimer, the term of this patent is extended or adjusted under 35 U.S.C. 154(b) by 180 days.

(21) Appl. No.: 14/154,450

(22) Filed: Jan. 14, 2014

(65) Prior Publication Data
US 2014/0127552 A1 May 8, 2014

Related U.S. Application Data

(63) Continuation of application No. PCT/CN2012/078386, filed on Jul. 9, 2012.

(30) Foreign Application Priority Data

Jul. 19, 2011 (CN) ...................... 2011 2 0255383 U

(51) Int. Cl.
*H01M 2/10* (2006.01)
*B60K 1/04* (2006.01)

(52) U.S. Cl.
CPC .......... *H01M 2/1083* (2013.01); *H01M 2/1077* (2013.01); *B60K 1/04* (2013.01)

(58) Field of Classification Search
CPC ..... B60K 1/04; H01M 2/1077; H01M 2/1083
See application file for complete search history.

(56) References Cited

U.S. PATENT DOCUMENTS

| | | | |
|---|---|---|---|
| 5,558,949 | A | 9/1996 | Iwatsuki et al. |
| 2005/0250005 | A1 | 11/2005 | Bacon et al. |
| 2009/0263705 | A1 | 10/2009 | Anantharaman |

FOREIGN PATENT DOCUMENTS

| | | |
|---|---|---|
| CN | 101141008 A | 3/2008 |
| CN | 202178305 U | 3/2012 |
| EP | 1278263 A2 | 1/2003 |
| JP | S 61-44588 A | 3/1986 |

(Continued)

OTHER PUBLICATIONS

PCT International Search Report and Written Opinion mailed Oct. 18, 2012, issued in International Application No. PCT/CN2012/078386 (10 pages).

*Primary Examiner* — Brittany Raymond
(74) *Attorney, Agent, or Firm* — Finnegan, Henderson, Farabow, Garrett & Dunner, LLP

(57) ABSTRACT

A power supply unit for an electric vehicle includes a tray and at least one battery module fixed on the tray via a strip. Each battery module includes a housing having a bottom plate mounted onto the tray, first to fourth side plates disposed on the bottom plate, a battery pack disposed in the housing and having a plurality of cells arranged along a thickness direction, and first flexible members disposed between the first side plate and the battery pack, and between the third side plate and battery pack respectively, for fastening the battery pack.

13 Claims, 3 Drawing Sheets

(56) References Cited

FOREIGN PATENT DOCUMENTS

| | | |
|---|---|---|
| JP | 2007-294407 A | 11/2007 |
| JP | 2008-192551 A | 8/2008 |
| JP | 2008-243412 A | 10/2008 |
| JP | 2009-021048 A | 1/2009 |
| JP | 2010-009809 A | 1/2010 |
| JP | 2010-086887 A | 4/2010 |
| WO | WO 2013/010442 A1 | 1/2013 |

POWER SUPPLY UNIT FOR ELECTRIC VEHICLE

CROSS REFERENCE TO RELATED APPLICATIONS

This application is a continuation application of International Application No. PCT/CN2012/078386, filed on Jul. 9, 2012, which claims priority and benefits of Chinese Patent Application No. 201120255383.9, filed with the State Intellectual Property Office of P. R. China on Jul. 19, 2011. The entire content of above-referenced applications is incorporated herein by reference.

FIELD

Embodiments of the present disclosure generally relate to a technical field of battery, more particularly, to a power supply unit for an electric vehicle.

BACKGROUND ART

An iron battery, as an energy storage device and an important component of an electric vehicle, has significant effects on capabilities of the electric vehicle. For example, swelling of battery cells may influence reliability of the battery, such as: (1) causing the cells to move in the battery module, and thus weakening the connection between the cells; (2) causing the size of the cells to be enlarged, and thus increasing requirements for the strength of the module housing and the space occupied of the module housing; (3) causing the clearance between the cells to be difficult to predetermine during designing due to uncontrollable factors: if the clearance is too small, the cells may be difficult to be disposed into the housing or the housing may be damaged; if the clearance is too large, the cells may rock in the module; (4) causing unequal clearances between the cells due to non-uniform swelling of the cells, and thus affecting the thermal uniformity of the battery.

Since the swelling of the general battery is uncontrollable, the reliability of the battery is low. Therefore, the reliability of the electric vehicle is low.

SUMMARY

Embodiments of the present disclosure seek to solve at least one of the problems existing in the prior art to at least some extent, or to provide a consumer with a useful commercial choice.

The present disclosure provides a power supply unit for an electric vehicle, comprising: a tray, at least one battery module fixed on the tray via a strip, each battery module including: a housing having a bottom plate mounted onto the tray and first to fourth side plates disposed on the bottom plate, the first and third side plates being opposed to each other in a first direction (e.g., a thickness direction), the second and fourth side plates being opposed to each other in a front-rear direction; and a battery pack disposed in the housing and having a plurality of cells arranged along the thickness direction; and first flexible members disposed between the first side plate and the battery pack, and between the third side plate and battery pack respectively, for fastening the battery pack.

According to the power supply unit for an electric vehicle of the present disclosure, the battery module is formed by fasten the battery pack into the housing and fixed on the tray via the strip, thus the battery is secured as a result of using the strip and the housing together, which may avoid the changing of the size and the position of the cells during the swelling of the cells, and ensure the thermal uniformity of the battery. Meanwhile, the battery pack can be disposed into the housing without rocking via the first flexible members, which can ensure the reliability of the power supply unit for an electric vehicle effectively.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference the accompanying drawings, in which.

DETAILED DESCRIPTION

Figure 1:
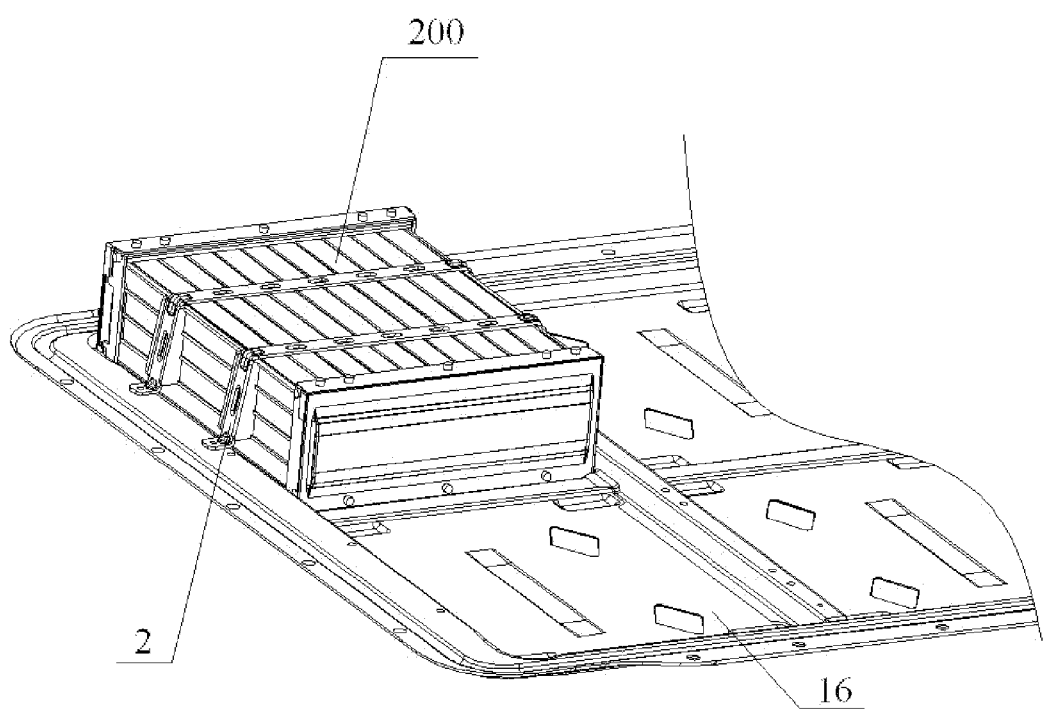
FIG. 1 is a schematic view of the structure of the power supply unit for an electric vehicle according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, Unless specified or limited otherwise, relative terms such as "front", "rear", "inner", "outer", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

A power supply unit for an electric vehicle according to an embodiment of the present disclosure, comprises: a tray, and at least one battery module fixed on the tray via a strip. The battery module may include a housing having a bottom plate mounted onto the tray and first to fourth side plates disposed on the bottom plate, the first and third side plates being opposed to each other in a first direction, the second and fourth side plates being opposed to each other in a second direction, a battery pack disposed in the housing and having a plurality of cells arranged along the first direction, and first flexible members disposed between the first side plate and the battery pack, and between the third side plate and battery pack respectively, for fastening the battery pack.

With the power supply unit for an electric vehicle according to embodiments of the present disclosure, the battery module is formed by fastening the battery pack into the housing and fixed on the tray via the strip, thus securing the battery module by cooperation of the strip and the housing. Such an arrangement may avoid changing of the size and the position of the cells during swelling of the cells, and ensure the thermal uniformity of the cells. Meanwhile, the battery pack can be disposed into the housing without rocking via the first flexible members, and the reliability of the power supply unit for an electric vehicle can be ensured effectively.

In a further embodiment of the present disclosure, the housing further comprises at least one support bar for fastening the battery pack.

Specially, the support bars comprises six support bars. The first and fourth support bars are disposed on the two ends of the first side plate in the front-rear direction respectively, the second and third support bars are disposed on the two ends of the third side plate in the front-rear direction respectively, the fifth support bar is connected between the first and second support bars, and the sixth support bar is connected between the third and fourth support bars.

In some embodiments of the present disclosure, the strip is in the form of a belt, one end of which is fixed onto the tray, and the other end thereof passes over the first side plate, the top surface of the battery module and the third side plate in turn and is finally fixed to the tray.

Alternatively, the power supply unit uses two strips. The two trips are parallel to each other.

In a further embodiment of the present disclosure, projections each having an inclined surface are disposed on outside surfaces of the first and third side plates respectively. The other end of the strip passes over the projection having the inclined surface of the first side plate, the top surface of the battery module and the projection having the inclined surface of the third side plate in turn, and is finally fixed to the tray.

Preferably, the first and third side plates are made from a metal material.

Alternatively, the second and fourth side plates are made from a plastic material.

The two ends of the strip are fixed to the tray via screws respectively.

The power supply unit further comprises second flexible members mounted between the second side plate and the battery pack, and between the fourth side plate and battery pack respectively, for protecting tabs of the cell.

The first and second flexible members are made from thermoplastic Elastomer.

The first and second flexible members are made from ethylene propylene diene monomer, silica gel or combination thereof.

The power supply unit for an electric vehicle according to embodiments of the present disclosure will be described in detail with reference to FIGS. 1-3 below. As an example, one battery module disposed on the tray will be described in the following.

Figure 2:
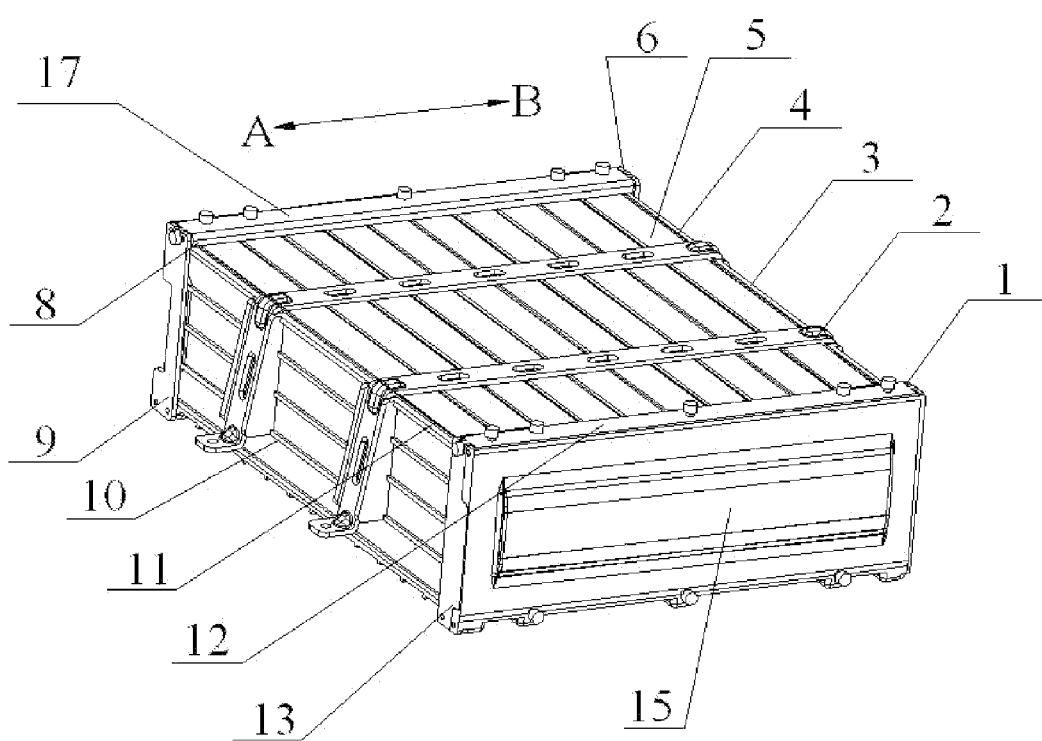
FIG. 2 is a schematic view of the structure of the battery module and the strip.

As shown in FIG. 1, a power supply unit for an electric vehicle according to embodiments of the present disclosure comprises a tray 16 and at least one battery module 200 fixed on the tray via a strip 2.

Each battery module 200 includes a housing and a battery pack 5 disposed in the housing. The battery pack 5 has a plurality of cells arranged along a first direction (e.g., a thickness direction). In the present disclosure, the thickness direction is indicated by A-B as shown in FIG. 2.

The housing has a bottom plate 14, first to fourth side plates disposed on the bottom plate 14, and at least one support bar for fastening the battery pack. The first to fourth side plates are indicated by 10, 17, 3, and 15 respectively. The first side plate 10 and the third side plate 3 are opposed to each other in the A-B direction and disposed at two sides of the battery pack 5 respectively. The second side plate 17 and the fourth side plate 15 are opposed to each other in a second direction (e.g., a front-rear direction) substantially perpendicular to the A-B direction. Thus, the first to fourth side plates form a parallel-epiped housing without a top cover, as shown in FIG. 2. The battery pack 5 is accommodated in the space defined in the housing. The bottom plate 14 is mounted onto the tray 16.

In the embodiment, the end at which the second side plate 17 is disposed is referred to as the front end of the battery module 200, while the end at which the fourth side plate 15 is disposed is referred to as the rear end of the battery module 200.

In the embodiments of the present disclosure, first flexible members 11 are disposed between the first side plate 10 and the battery pack 5, and between the third side plate 3 and battery pack 5 respectively. In some embodiments, the first flexible members 11 are made from an elastic material, for fastening the battery pack and protecting the battery pack 5 from deformation caused by squeezing housing during fastening the battery pack 5 using the strip 2. Meanwhile, because of the first flexible members 11, the tolerance can be eliminated, and the uncertain clearance caused during the installation of the battery packs can be avoided.

Support bars are used to fasten the first to fourth side plates to the bottom plate 14, thus limiting the size of the housing. Otherwise, the size of the cells and the moving distance of the cells may be changed significantly during swelling of the cells. Particularly, the support bars comprise a first support bar 9, a second support bar 6, a third support bar 1, a fourth support bar 13, a fifth support bar 8, and a sixth support bar 12.

The first support bar 9 and the fourth support bar 13 are disposed at two ends of the first side plate 10 in the front-rear direction respectively, the second support bar 6 and the third support bar 1 are disposed at two ends of the third side plate 3 in the front-rear direction respectively. The fifth support bar 8 is connected between the first support bar 9 and the second support bar 6, and the sixth support bar 12 is connected between the third support bar 1 and the fourth support bar 13.

With the fifth support bar 8 connected between the first support bar 9 and the second support bar 6, the first to third side plates 10, 17 and 3 are further fastened via the first support bar 9, the second support bar 6, and the fifth support bar 8. That is, the front end of the battery module 200 is secured, and the housing is prevented from deformation when the strip 2 exerts forces to the housing.

Similarly, with the sixth support bar 12 connected between the third support bar 1 and the fourth support bar 13, the first side plate 10, the fourth side plate 15 and the third side plate 3 are further fastened via the third support bar 1, the fourth support bar 13, and the sixth support bar 12. That is, the rear end of the battery module 200 is secured, and the housing is prevented from deformation when the strip 2 exerts forces to the housing.

As the battery pack 5 is fastened via the first to sixth support bars, the bottom plate, and the first to fourth side plates, the size of the battery module 200 is determined, which ensures a reliable connection between the cells, and protects the housing from deformation during the swelling of the cells.

In the embodiments of the present disclosure, the first side plate 10 and the third side plate 3 are preferably made from a metal material. Particularly, the first side plate 10 and the third side plate 3 bear the fastening force of the strip 2 directly, and transfer the force to the battery pack 5 in the housing, thus pressing the cells to against each other along the thickness direction. Alternatively, the second and fourth side plates may be made from a plastic material.

As shown in FIG. 1, the strip 2 is in the form of a belt, one end of which is fixed onto the tray 16, and the other end thereof passes over the first side plate 10, the top surface of the battery module 200 and the third side plate 3 in turn, and is fixed to the tray 16.

Preferably, a plurality of strips are provided. More preferably, two strips parallel to each other are provided, as shown in FIGS. 1 and 2.

In the embodiments of the present disclosure, the strip 2 exerts forces to the first side plate 10 and the third side plate 3, and thus the first side plate 10 and the third side plate 3 abut against the battery pack 5 respectively, clamping the battery pack. Therefore, the strip may be made of a material with a high strength, such as stainless steel or SPCC (Steel Plate Cold Commercial).

Figure 3:
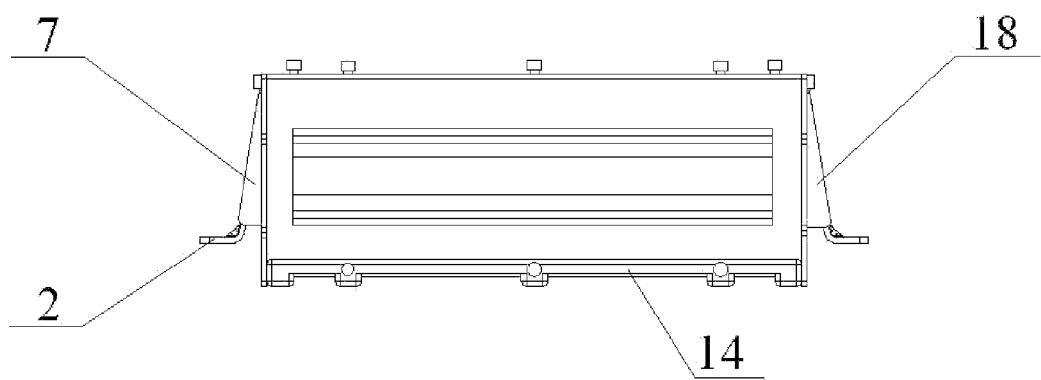
FIG. 3 is a front view of the structure in FIG. 2.

In a preferable embodiment of the present disclosure, projections each having an inclined surface are disposed on outside surfaces of the first side plate 10 and the third side plate 3 respectively, as shown in FIG. 3. The other end of the strip 2 passes over the projection 7 of the first side plate 10, the top surface of the battery module 200 and the projection 18 of the third side plate 3 in turn, and is fixed to the tray 16. The two ends of the strip 2 are fixed to the tray 16 via screws respectively. Therefore, the first side plate 10 and the third side plate 3 are fastened further to the battery pack 5 via fixing the two ends of the strip 2 to the tray 16. Meanwhile, with the projections each having an inclined surface, the forces exerted by strip 2 are transferred to the first side plate 10 and the third side plate 3, which press the cells against each other. Consequently, the battery pack 5 is fastened.

In another preferable embodiment of the present disclosure, the power supply unit further comprises second flexible members disposed between the second side plate 17 and the battery pack 5, and between the fourth side plate 15 and battery pack 5 respectively, for protecting tabs of the cells.

The assembling method of the power supply unit for an electric vehicle according to embodiments of the present disclosure will be described in detail with reference to FIGS. 1-3 below.

The flexible members 4 is attached to the inside surfaces of the first side plate 10 and the third side plate 3 respectively. The battery pack 5 formed by arranging a plurality of cells along the thickness direction is disposed between the first side plate 10 and the third side plate 3, so that the battery pack 5 is clamped by the flexible members 4 attached to the first and third side plates 10, 13. The battery pack 5, and the first and third side plates are disposed on the bottom plate 14.

The first support bar 9 and the fourth support bar 13 are mounted on the two ends of the first side plate 10 in the front-rear direction respectively, and the second support bar 6 and the third support bar 1 are mounted on the two ends of the third side plate 3 in the front-rear direction respectively. Then the fifth support bar 8 is connected between the first support bar 9 and the second support bar 6, and the sixth support bar 12 is connected between the third support bar 1 and the fourth support bar 13. Next, the cells of the battery pack 5 are connected to each other in series or in parallel by welding. Finally, the second side plate 17 is connected via screws respectively with the first support bar 9, the second support bar 6, and the fifth support bar 8, and the fourth side plate 15 is connected via screws respectively with the fourth support bar 13, the third support bar 1, and the sixth support bar 12. Therefore, the battery module 200 is formed.

The battery module 200 is then disposed on the tray 16. One end of the strip 2 is fixed onto the tray 16, and the other end thereof passes over the projection 7 of the first side plate 10, the top surface of the battery module 200 and the projection 18 of the third side plate 3 in turn, and is fixed to the tray 16 via screws. Therefore, the power supply unit for an electric vehicle according to embodiments of the present disclosure is formed.

In embodiments of the present disclosure, the first and second flexible members may be made of any known material with elasticity, for example, the first and second flexible members may be made of thermoplastic Elastomer (TPE). Alternatively, the first and second flexible members may be made of ethylene propylene diene monomer or silica gel.

In the power supply unit for an electric vehicle according to embodiments of the present disclosure, the swelling of the cells can be limited by the housing, so that the capability and the reliability of the battery pack is ensured. Meanwhile, the space occupied by the power supply unit is small, and the operation and assembling of the power supply unit is simple.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. A power supply unit for an electric vehicle, comprising:
a tray; and
at least one battery module fixed on the tray via a strip, each battery module including:
a housing having a bottom plate mounted on the tray and first to fourth side plates disposed on the bottom plate, the first and third side plates being opposed to each other in a first direction, the second and fourth side plates being opposed to each other in a second direction; and
a battery pack disposed in the housing and having a plurality of cells arranged along the first direction; and
first flexible members disposed between the first side plate and the battery pack, and between the third side plate and battery pack respectively, for fastening the battery pack.

2. The power supply unit as set forth in claim 1, wherein the housing further comprises at least one support bar for fastening the battery pack.

3. The power supply unit as set forth in claim 2, wherein the support bars comprise first to sixth support bars,
wherein the first and fourth support bars are disposed on the two ends of the first side plate in the second direction respectively, the second and third support bars are disposed on the two ends of the third side plate in the second direction respectively, the fifth support bar is connected between the first and second support bars, and the sixth support bar is connected between the third and fourth support bars.

4. The power supply unit as set forth in claim 1, wherein the strip is in the form of a belt, one end of which is fixed onto the tray, and the other end thereof passes over the first side plate, a top surface of the battery module and the third side plate in turn, and is fixed to the tray.

5. The power supply unit as set forth in claim 4, wherein the power supply unit includes two strips.

6. The power supply unit as set forth in claim 5, wherein the two trips are parallel to each other.

7. The power supply unit as set forth in claim 4, wherein the first and third side plates include projections each having an inclined surface.

8. The power supply unit as set forth in claim 4, wherein the two ends of the strip are fixed to the tray via screws.

9. The power supply unit as set forth in any one of claim 1, wherein the first and third side plates are made from a metal material.

10. The power supply unit as set forth in claim 9, wherein the second and fourth side plates are made from a plastic material.

11. The power supply unit as set forth in claim 1, further comprising second flexible members mounted between the second side plate and the battery pack, and between the fourth side plate and battery pack respectively, for protecting tabs of the cell.

12. The power supply unit as set forth in claim 11, wherein the first and second flexible members are made from thermoplastic Elastomer.

13. The power supply unit as set forth in claim 11, wherein the first and second flexible members are made from ethylene propylene diene monomer, silica gel or combination thereof.

* * * * *